(12) United States Patent
Campbell et al.

(10) Patent No.: US 7,933,512 B2
(45) Date of Patent: Apr. 26, 2011

(54) STEREO CAMERA WITH CONTROLLABLE PIVOT POINT

(76) Inventors: Patrick Campbell, Stevenson Ranch, CA (US); Vincent Pace, Shadow Hills, CA (US)

(*) Notice: Subject to any disclaimer, the term of this patent is extended or adjusted under 35 U.S.C. 154(b) by 134 days.

(21) Appl. No.: 12/410,395

(22) Filed: Mar. 24, 2009

(65) Prior Publication Data

US 2010/0247088 A1   Sep. 30, 2010

(51) Int. Cl.
*G03B 35/00* (2006.01)
*G03B 17/00* (2006.01)
*G03B 41/00* (2006.01)
*G03B 13/00* (2006.01)
*H04N 13/02* (2006.01)

(52) U.S. Cl. ............ 396/325; 396/79; 396/85; 396/333; 348/47; 348/240.99; 348/345

(58) Field of Classification Search ............ 396/325, 396/79, 85, 89, 322, 324, 331, 333; 348/42, 348/47, 240.99, 345
See application file for complete search history.

(56) References Cited

U.S. PATENT DOCUMENTS

| | | | |
|---|---|---|---|
| 4,557,570 A | 12/1985 | Hines | |
| 4,650,305 A | 3/1987 | Hines | |
| 4,725,863 A | 2/1988 | Dumbreck et al. | |
| 4,751,570 A | 6/1988 | Robinson | |
| 4,881,122 A | 11/1989 | Murakami | |
| 4,916,475 A | 4/1990 | Hori | |
| 4,999,713 A | 3/1991 | Ueno et al. | |
| 5,175,616 A | 12/1992 | Milgram | |
| 5,532,777 A | 7/1996 | Zanen | |
| 5,740,337 A | 4/1998 | Okino et al. | |
| 5,864,360 A * | 1/1999 | Okauchi et al. | 348/47 |
| 6,035,140 A | 3/2000 | Hasushita | |
| 6,326,994 B1 | 12/2001 | Yoshimatsu | |
| 6,414,709 B1 | 7/2002 | Palm et al. | |
| 6,512,892 B1 | 1/2003 | Montgomery et al. | |
| 6,701,081 B1 | 3/2004 | Dwyer et al. | |
| 6,791,598 B1 | 9/2004 | Luken | |
| 6,798,406 B1 | 9/2004 | Jones et al. | |
| 2006/0204240 A1 | 9/2006 | Cameron et al. | |

OTHER PUBLICATIONS

World Intellectual Property Organization, International Search Report and Written Opinion of the International Searching Authority for International Application No. PCT/US2010/027019, Mail Date May 11, 2010, pp. 1-6.
21st Century3d.com, 21st Century 3D Introduces Uncompressed 4:4:4 Stereoscopic Camera System—3DVX3, Jan. 18, 2006, SPIE Stereoscopic Displays and Applications Conference; avail. Http://www.21stcentury3d.com/press/pr-060117-3dvx3.html; printed Sep. 11, 2008, 3pp.
FullCamera.com, 21st Century 3D Introduces New Digital Stereoscopic Motion Picture Camera System, Apr. 14, 2008, avail. http://fullcamera.com/article/cfm/id/281457, printed Sep. 11, 2008, 2pp.
Matt Hurwitz, Dreaming in 3D, CineGear Exop News, The Official CineGear Expo Newspaper, Jun. 3-5, 2005, pp. 18-19.

* cited by examiner

*Primary Examiner* — Rochelle-Ann J Blackman
(74) *Attorney, Agent, or Firm* — SoCal IP Law Group LLP; Steven C. Sereboff; John E. Gunther

(57) ABSTRACT

There is disclosed stereographic camera system including first and second cameras including respective first and second lenses. A convergence mechanism may set a convergence angle by rotating at least the first camera about a first pivot axis. A first pivot shift mechanism may adjust the position of the first camera such that the first pivot axis passes through a nodal point of the first lens.

19 Claims, 7 Drawing Sheets

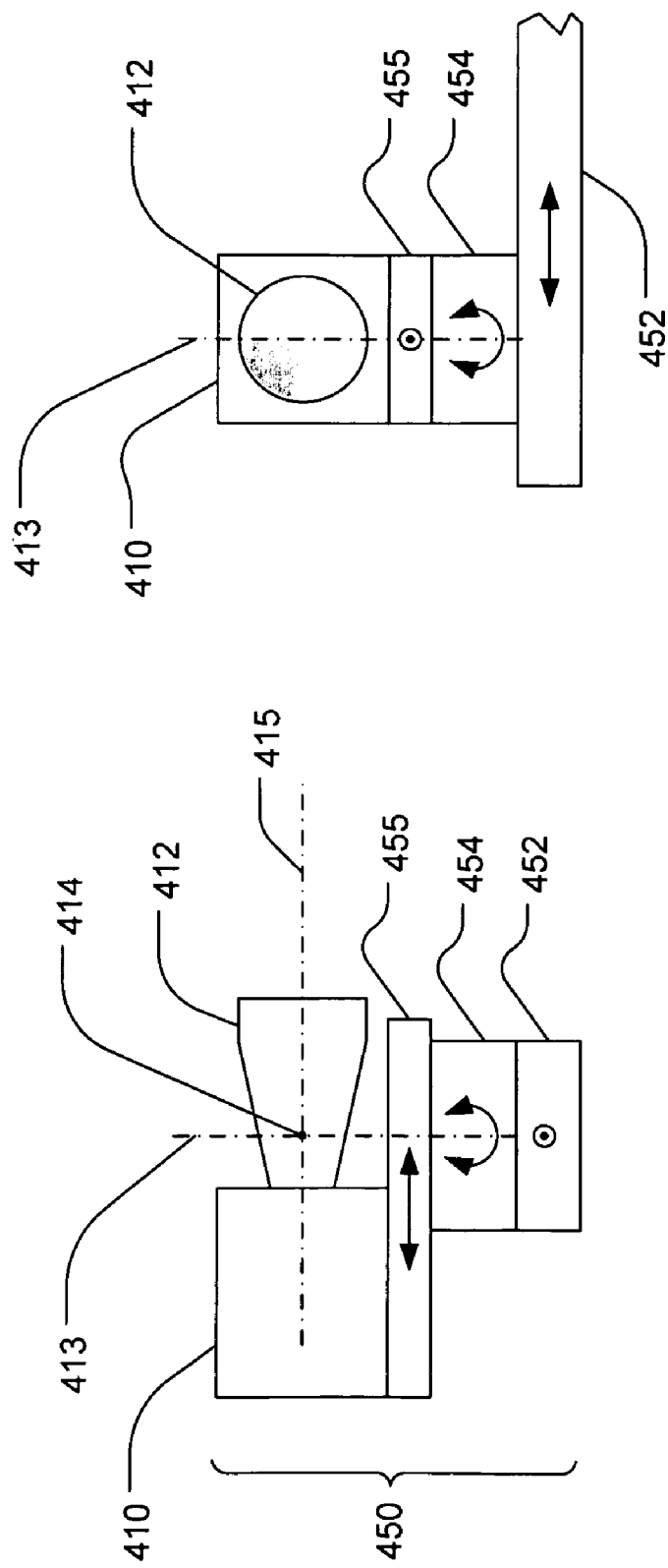

STEREO CAMERA WITH CONTROLLABLE PIVOT POINT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on objects afar, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of a second polarization state. This technique has been used to present 3-D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

DESCRIPTION OF THE DRAWINGS

FIG. 4A is a schematic side view of a portion of a camera platform of a stereographic camera system.

FIG. 4B is a schematic end view of the camera platform of FIG. 3A.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
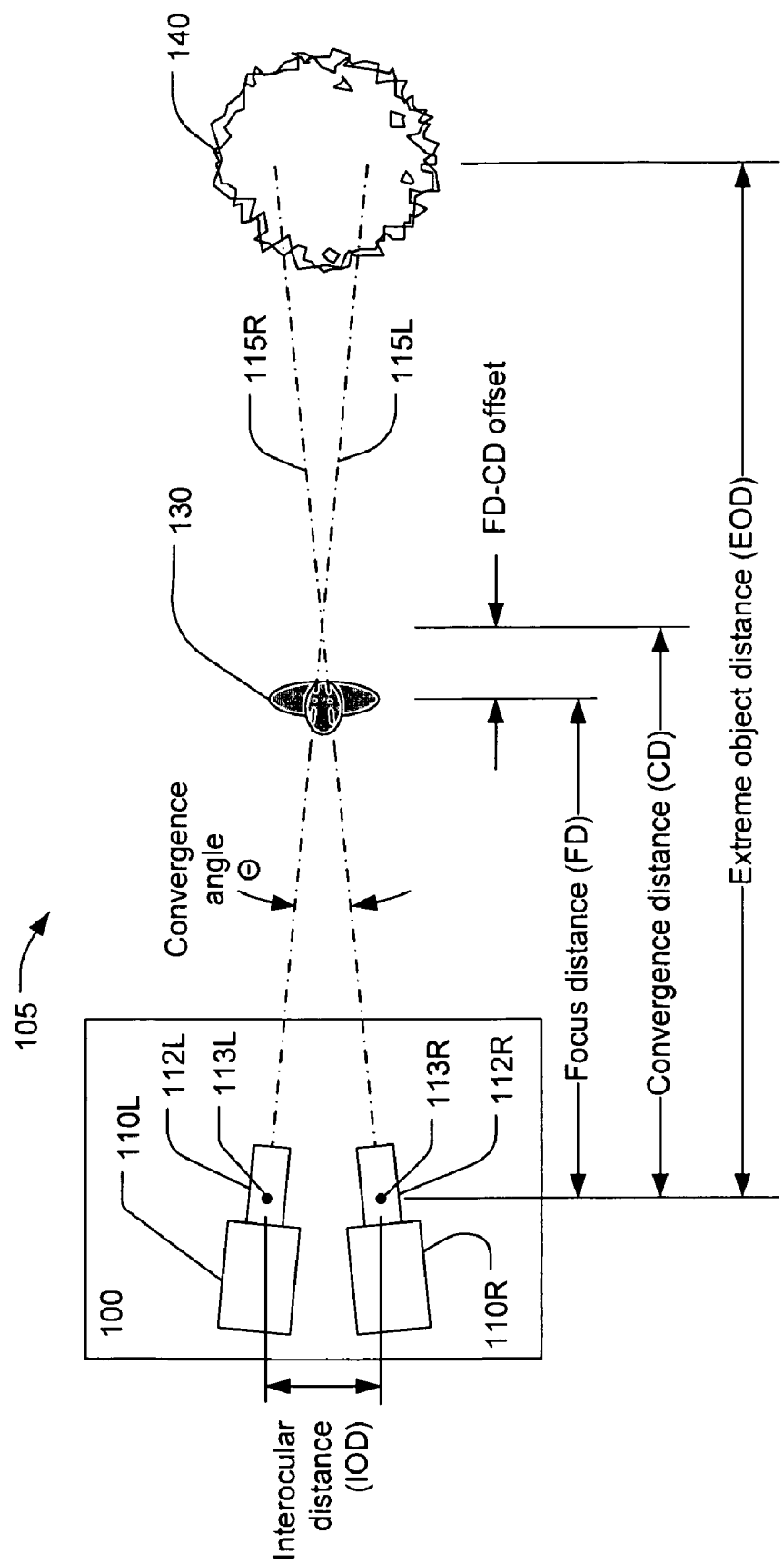
FIG. 1 is a schematic drawing of a stereographic camera in an environment.

Referring now to FIG. 1, a stereographic camera 100 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. The left and right cameras 110L, 110R may be separated by an interocular distance IOD. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

The cameras 110L, 110R may be disposed such that the axes 115L, 115R are parallel or such that a convergence angle ⊖ is formed between the two axes 115L, 115R. The cameras 110L, 110R may be disposed such that the axes 115L, 115R cross at a convergence distance CD from the cameras. The interocular distance IOD, the convergence distance CD, and the convergence angle Θ are related by the formula $$\Theta = 2A\ \text{TAN}(\text{IOD}/2\text{CD}), \text{or} \quad (1)$$

$$\text{CD} = \text{IOD}/[2\ \text{TAN}(\Theta/2)]. \quad (2)$$

The interocular distance IOD and the convergence distance CD may be measured from a nodal point within the lenses 112L, 112R. The convergence angle Θ may be set by rotating each of the cameras 110L, 110R about a corresponding pivot axis 113L, 113R.

The stereographic camera 100 may be used to form a stereographic image of a scene 105. As shown in the simplified example of FIG. 1, the scene 105 may include a primary subject 130, which is shown, for example, as a person. The scene 105 may also include other features and objects in the background (behind the primary subject). The distance from the cameras 110L, 110R to the furthest background object 140, which is shown, for example, as a tree, may be termed the extreme object distance EOD.

When the images from a stereographic camera, such as the stereographic camera 100, are displayed on a viewing screen, scene objects at the convergence distance will appear to be in the plane of the viewing screen. Scene objects, such as the primary subject 130 in the example of FIG. 1, located closer to the stereographic camera may appear to be in front of the viewing screen. Scene objects, such as the tree 140, located further from the stereographic camera may appear to be behind the viewing screen.

Each lens 115L, 115R may have adjustable focus. Both lenses 115L, 115R may be focused at a common adjustable focus distance FD. The focus distance FD may be adjusted manually, or may be automatically adjusted. The focus distance FD may be adjusted such that the cameras 110L, 110R are focused on the primary subject 130. The focus distance may be automatically adjusted in response to a sensor (not shown) that determines the distance from the cameras 110L, 110R to the primary subject 130. The sensor to determine the distance from the cameras to the primary subject may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 130. However, as shown in FIG. 1, the convergence distance CD and the focus distance FD may not be the same distance. For example, the focus distance FD may be set at the distance from the cameras to the primary subject and the convergence distance CD may be set slightly longer than the focus distance. In this case, when the images are displayed, the primary subject will be seen to be in front of the plane of the viewing screen.

Each lens 115L, 115R may also have zoom capability, which is to say that the focal length FL of each lens may be adjusted. Both lenses 115L, 115R may always have precisely the same focal length. The focal length adjustment of the two lenses 115L, 115R may be coupled mechanically, electrically, electronically, electromechanically, or by another coupling mechanism. Commonly, the focal length of the lenses 115L, 115R may be adjusted manually. The focal length of the two lenses 115R, 115L may also be adjusted automatically in accordance with a predetermined scenario.

Figure 2:
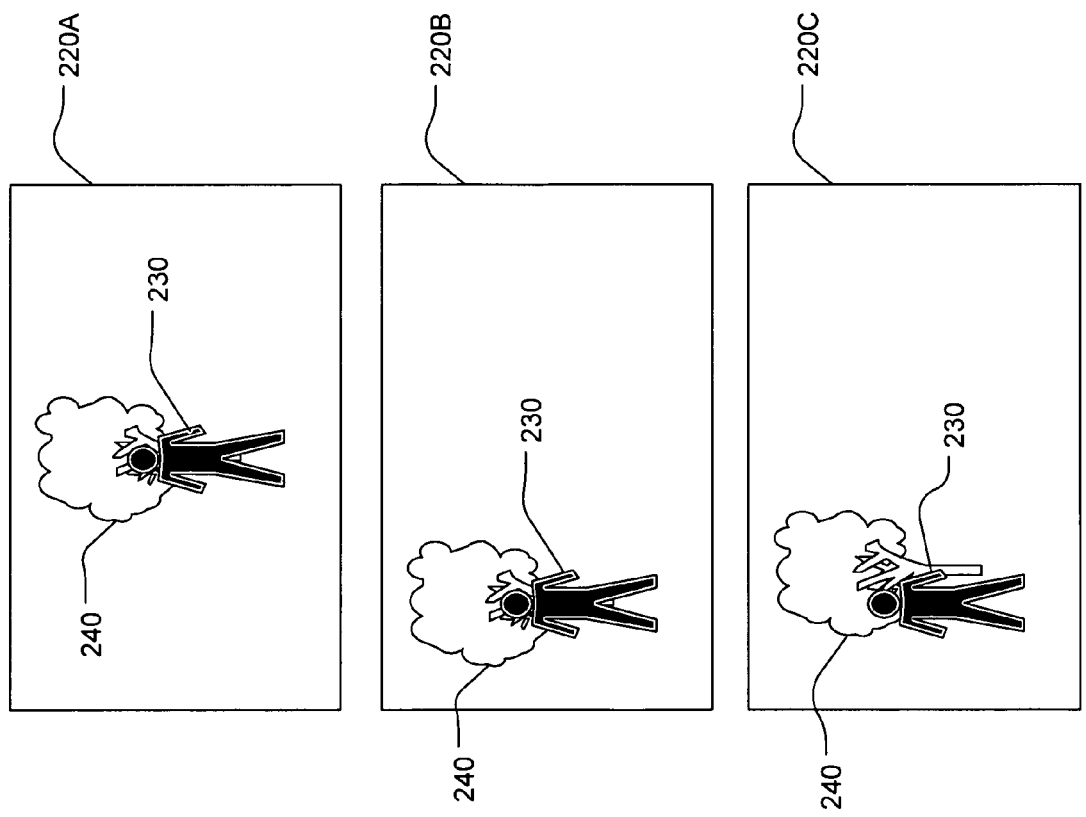
FIG. 2A is a representation of an image captured by a camera.
FIG. 2B is a representation of an image captured by a camera.
FIG. 2C is a representation of an image captured by a camera.

Referring now to FIG. 2A, an image 220A captured by a camera, which may be one of the cameras 110L, 110R, or another camera, may show a scene including a first object 230 directly in front of a second object 240. FIG. 2B shows an image 220B of the same scene after the camera has been rotated about a pivot axis which passes through a nodal point of the camera lens. The first object 230 and second object 240 are now positioned to the left side of the image with the first object 230 still directly in front of the second object 240. A "nodal point" is a point on the axis of a camera lens about which the camera and lens may be rotated without introducing parallax into the image captured by the camera. FIG. 2C shows an image 220C of the scene of FIG. 2A after the camera has been rotated about an axis that does not pass through a nodal point. The first object 230 and second object 240 are now positioned to the left side of the image but are no longer in a direct line.

Stereography relies on the differences in position of objects within a pair of images to provide an illusion of depth. As shown in FIG. 2C, parallax may be introduced if one or both of the cameras of a stereographic camera system are rotated about an axis that does not pass through a nodal point. Such parallax may cause undesired shifts in the apparent depths of objects in a stereographic image. To avoid introducing parallax, the convergence angle of a stereographic camera system may be set by rotating one or both cameras about respective pivot axes that pass through nodal points of the respective lenses.

Figure 3:
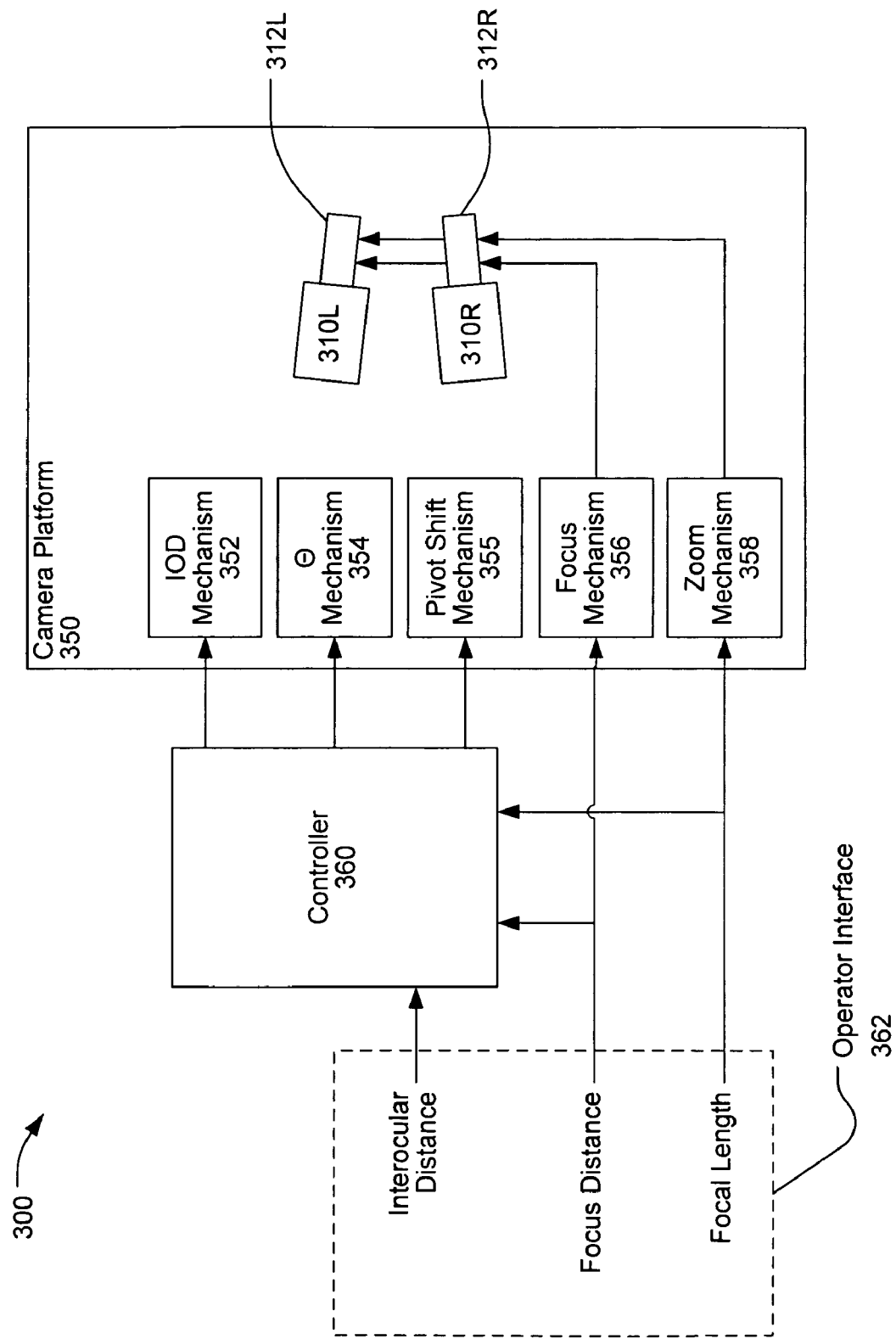
FIG. 3 is a block diagram of a stereographic camera system.

Referring now to FIG. 3, a stereographic camera system 300, which may be suitable for use as the camera 100 shown in FIG. 1, may include a camera platform 350 coupled to a controller 360. The camera platform 350 may include a left camera 310L and a right camera 310R, each of which has an associated lens 312L, 312R.

The camera platform 350 may include a plurality of mechanisms to adjust the position and/or orientation of the left and right cameras 310L, 310R and to adjust characteristics of the lens and right lenses 312L, 312R. In this patent, the term "mechanism" refers to a combination of mechanical, electrical, and electromechanical components including at least one component movable with respect to other components and an actuator which causes relative motion of the movable component. The relative motion may be linear, angular, a combination or linear and angular, or some other movement. The movable components may be coupled by rotary or linear slides, bearings, bushings, or other devices. The actuator may be a motor or a manually operated lever, knob, crank, ring, or other device. The actuator may be all or a portion of one of the movable components, or may be coupled to the movable components by way of one or more gears, belts, links, and other devices. Examples of mechanisms include motorized linear or rotational motion stages and manual or motorized systems currently used to adjust focus and aperture on cinematic camera lenses The camera platform 350 may include an IOD mechanism 352 to adjust an interocular distance between the left camera 310L and the right camera 310R. The camera platform 350 may include a Θ mechanism 354 to adjust a convergence angle between the left camera 310L and the right camera 310R by rotating one or both of the cameras 310L, 310R about respective pivot axes. The camera platform 350 may include a pivot shift mechanism 355 to adjust the positions of the pivot axes, with respect to the cameras 310L, 310R, such that each camera 310L, 310R may rotate about a pivot axis passing through a respective nodal point. The IOD mechanism 352 and the ⊖ mechanism 354 may include one or more movable platforms or stages coupled to motors or other actuators. The pivot shift mechanism 355 may include one or more additional movable platforms or stages, or may be integrated with the IOD mechanism 352 and the ⊖ mechanism 354.

The IOD mechanism 352, the ⊖ mechanism 354, and the pivot shift mechanism 355 may be used in combination to set the interocular distance, the convergence angle, and the relative location of the pivot axes, respectively, in response to data received from the controller 360. Within this patent, the term "data" is intended to include digital data, commands, instructions, digital signals, analog signals, optical signals and any other data that may be used to communicate the value of a parameter such as interocular distance or convergence angle.

The camera platform 350 may include a focus mechanism 356 to synchronously adjust and set the focus distance of the lenses 312L, 312R. The focus mechanism 356 may include a mechanical, electronic, electrical, or electromechanical linkage between the lenses 312L, 312R to simultaneously adjust the focus distance of both lenses to the same value. The focus mechanism 356 may include a motor or other actuator adapted to set the focus distance in response to data received from the controller 360. The focus mechanism 356 may be manually controlled by an operator such as a cameraman or assistant cameraman (commonly called a "focus puller"). When manually controlled, the focus mechanism 356 may include an encoder, potentiometer, or other sensor to provide data indicating the focus distance to the controller 360. The focus mechanism 356 may be adapted to operate under manual control and/or in response to data received from the controller 360.

The camera platform 350 may include a zoom mechanism 358 to synchronously adjust and set the focal length of the lenses 312L, 312R. The zoom mechanism 358 may include a mechanical, electronic, electrical, or electromechanical linkage between the lenses 312L, 312R to simultaneously adjust the focal length of both lenses to the same value. The zoom mechanism 358 may include a motor or other actuator adapted to set the focal length in response to data received from the controller 360. The zoom mechanism 358 may be manually controlled by an operator such as a cameraman or assistant cameraman. When manually controlled, the zoom mechanism 358 may include an encoder, potentiometer, or other sensor to provide data indicating the focal length to the controller 360. The zoom mechanism 358 may be adapted to operate either under manual control or in response to data received from the controller 360.

The controller 360 may be coupled to an operator interface 362. The controller 360 may receive data from the operator interface 362 indicating an interocular distance. The controller 360 may receive data from the operator interface 362 indicating a maximum allowable disparity and a maximum object distance indicating the distance from the camera to the furthest object in a scene. The controller 360 may then use the maximum allowable disparity and the maximum object distance to calculate an interocular distance as described in copending application Ser. No. 12/049,316, entitled "Stereo Camera With Automatic Control of Interocular Distance", filed Mar. 23, 2009. The controller 360 may also receive data from the operator interface 362 indicating the focus distance and focal length of the lenses 312L, 312R.

The operator interface 362 may be partially or wholly incorporated into the camera platform 350. For example, the focus mechanism 356 and/or the zoom mechanism 358 may be manually controlled by one or more operators such as a cameraman and/or an assistant cameraman. In this case, the focus mechanism 356 and/or the zoom mechanism 358 may provide data to the controller 360 indicating the manually-set focus distance and/or focal length. Similarly, control actuators to set the interocular distance and/or maximum disparity may be located on the camera platform for operation by the cameraman and/or the assistant cameraman.

The operator interface 362 may be partially or wholly incorporated into the controller 360. For example, in situations where the interocular distance and/or the maximum allowable disparity are fixed during the recording of a scene, the interocular distance and/or the maximum allowable disparity may be manually provided to the controller using a keyboard or other data entry device. In situations where one or both of the interocular distance and/or the maximum allowable disparity will be varied during the recording of a scene, interocular distance and/or the maximum allowable disparity may be controlled using, for example, arrows keys on a keyboard or one or more continuous control devices such as a potentiometer, joystick or mouse.

The controller 360 may interface with the camera platform 350. The controller 360 may be integrated into the camera platform 350. The controller may provide data to and/or receive data from the focus mechanism 356 and the zoom mechanism 358 indicating the focus distance and focal length, respectively, of the lenses 312L, 312R.

The controller 360 may provide data to the IOD mechanism 352 and the ⊖ mechanism 354 to set the interocular distance and the convergence angle, respectively, between the cameras 310L, 310R. For example, the controller 360 may provide data to the IOD mechanism 352 and the ⊖ mechanism 354 to set the convergence distance equal to the focus distance of the lenses 312L, 312R. When the pivot shift mechanism 355 is integrated with the IOD mechanism 352 and the ⊖ mechanism 354, the controller 360 may provide data to the IOD mechanism 352 and the ⊖ mechanism 354 to align virtual pivot axes with the nodal points of the respective lenses 312L, 312R. For example, the controller 360 may provide data to the IOD mechanism 352 and the ⊖ mechanism 354 to position the virtual pivot axes based on the focal length of the lenses 312L, 312R. The controller 360 may include a memory which stores information relating the locations of the nodal points of the respective lenses 312L, 312R to the focal length. The information relating the locations of the nodal points of the respective lenses 312L, 312R to the focal length may be in the form of a look-up table, a formula, a mathematical expression, or other data.

When the pivot shift mechanism 355 is independent of the IOD mechanism 352 and the ⊖ mechanism 354, the controller 360 may provide data to the pivot shift mechanism 355 to set the position of the pivot axis or axes for the cameras 310L, 310R. The controller 360 may provide data to the pivot shift mechanism 355 to set the pivot axis to the appropriate positions based on the focal length of the lenses 312L, 312R.

FIG. 4A and FIG. 4B are side and front schematic views, respectively, of a portion of a camera platform 450 supporting one camera 410 of a stereographic camera system. The camera platform 450 may be a portion of the camera platform 350 shown in FIG. 3. FIG. 4A and FIG. 4B are schematic views which show the functional elements of the camera platform as blocks without mechanical details.

The camera 410 may include a lens 412 which may be a fixed-focal length, or "prime", lens or a zoom lens having an adjustable focal length. The lens may have an optical axis 415 and at least one nodal point 414 disposed along the optical axis 415. The location of the nodal point 414 of a zoom lens may move along the optical axis 415 as the focal length of the lens 412 is adjusted.

The camera 410 may be supported within the platform 450 in a manner that allows adjusting an interocular distance and a convergence angle between the camera 410 and a second camera (not shown in FIG. 4) of the stereographic camera system.

The platform 450 may include an IOD mechanism 452 to set the interocular distance between the camera 410 and the second camera of the stereographic camera system. The IOD mechanism 452 may be, for example, a linear motion stage that moves the camera 410 along a direction roughly orthogonal to the optical axis 415. The IOD mechanism 452 may be driven by a first motor (not shown) responsive to a controller such as the controller 560.

The platform 450 may include a convergence mechanism 454 to set the convergence angle between the camera 410 and the second camera of the stereographic camera system. The convergence mechanism 454 may be, for example, a rotary motion stage that rotates the camera 410 about a pivot axis 413. The convergence mechanism 452 may be driven by a second motor (not shown) responsive to a controller such as the controller 560.

The platform 450 may include a pivot shift mechanism 455 to position the camera 410 such that the pivot axis 413 passes through the nodal point 414 of the lens 412. The pivot shift mechanism 455 may be, for example, a linear motion stage or slide adapted to move the camera 410 in a direction essentially parallel to the optical axis 415. The pivot shift mechanism 455 may be driven by a third motor (not shown) responsive to a controller such as the controller 560.

The pivot shift mechanism 455 may be controlled to move the camera 410 synchronously with an adjustment to the focal length of the lens 412, such that the pivot axis 413 passes through the nodal point 414 of the lens for any and all focal length settings.

One or both cameras in a stereographic camera system may move to set the interocular distance and the convergence angle. The second camera, not shown in FIG. 4, may be stationary or fixed. The second camera may be coupled to the IOD mechanism 452 by a convergence mechanism and pivot shift mechanism similar to or the same as the convergence mechanism 454 and pivot shift mechanism 455. In this case, the second camera may be controlled to move as a mirror image of the first camera 410.

Instead of, or in addition to, a mechanical pivot shift mechanism, an IOD mechanism and a convergence mechanism of a stereographic camera system may be controlled to rotate one or both cameras about virtual pivot points. In this case, the pivot shift mechanism may be effectively integrated with the IOD mechanism and the convergence mechanism. FIG. 5A shows a portion of a camera platform 550 including one camera 510 of a stereographic camera system. The camera platform 550 may be the camera platform 350 shown in FIG. 3.

The camera 510 may include a lens 512 which may be a prime lens having a fixed focal length or a zoom lens having an adjustable focal length. The lens may have an optical axis 515A and at least one nodal point 514, indicated by the dashed circle, disposed along the optical axis 515A. The location of the nodal point 514 of a zoom lens may move along the optical axis 515A as the focal length of the lens 512 is adjusted.

The camera platform 550 may include a convergence mechanism including a rotatable convergence plate 576. The camera 510 may be mounted on the convergence plate 576. The camera platform 550 may include an IOD mechanism which may be a linear slide 572. The convergence plate 576 may be rotatably coupled to the linear slide 572 at a first pivot point 574A. The convergence plate may rotate about the first pivot point 574A to set the convergence angle of the stereographic camera. The convergence mechanism may include a first motor (not shown) to drive the rotation of the convergence plate. The first motor may be responsive to a controller, which may be the controller 360.

The camera platform 551 may include a second convergence plate (not shown) on which is mounted a second camera (not shown) of the stereographic camera system. The second convergence plate may be rotatably coupled to the linear slide 572 at a second pivot point (not shown).

The linear slide 572 may be adapted to allow adjustment of the distance between the first pivot point 574A and the second pivot point. The IOD mechanism may include a second motor (not shown) to drive the motion of the linear slide 572. The second motor may be responsive to the controller.

Figure 5B:
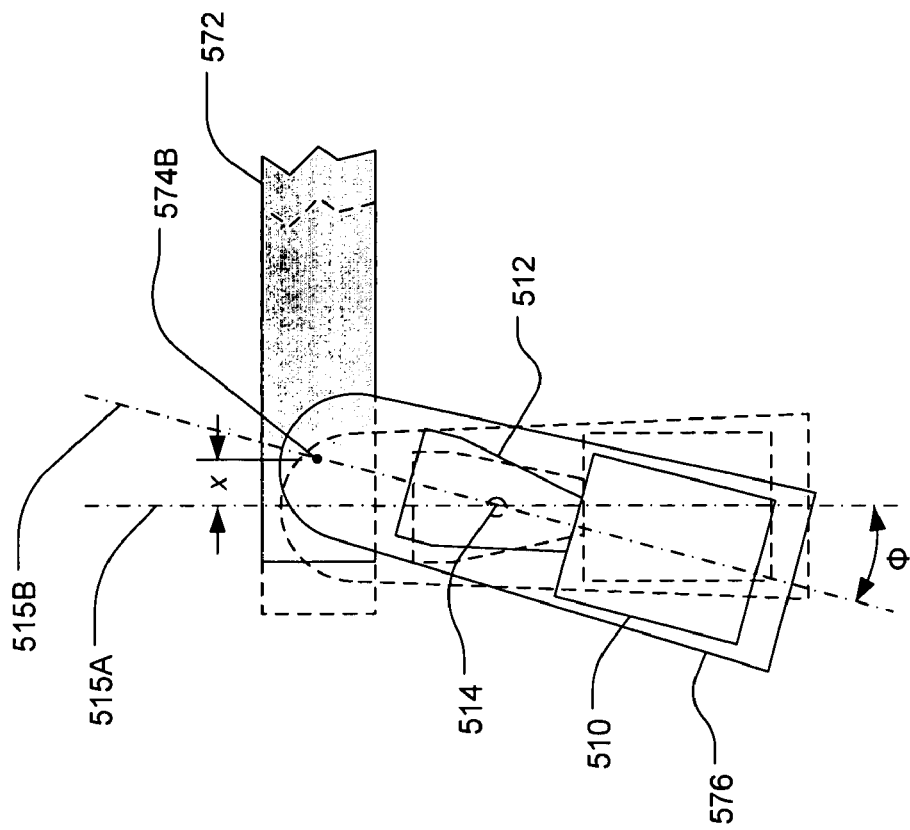
FIG. 5B is schematic top view of the camera platform of FIG. 4A showing a camera rotated about a virtual pivot point.
Figure 5A:
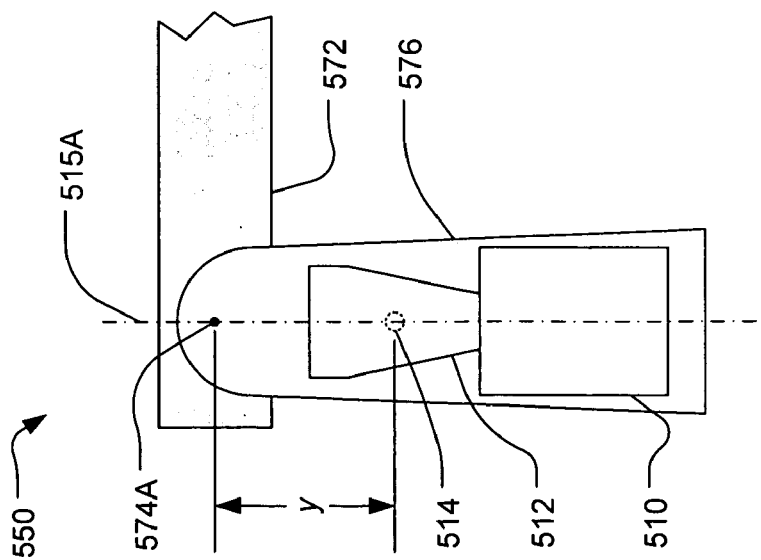
FIG. 5A is schematic top view of a portion of a camera platform of a stereographic camera system.

FIG. 5B shows the camera 510 rotated by an angle (about a virtual pivot axis aligned with the nodal point 514. For comparison, the original position of the camera 510 and camera platform 550, as shown in FIG. 5A, are shown in dashed lines. The angle $\Phi$ is formed between the optical axis 515B of the camera 510 and the original optical axis 515A as shown in FIG. 5A. To rotate the camera 510, the convergence mechanism may rotate the convergence plate 576 about the first pivot point 574 by the angle $\Phi$. The length of the linear slide 572 may be controlled such that the pivot point 574B is shifted by a distance $x=y \sin(\Phi)$, where y is the distance between the pivot point 574A and the nodal point 514 along the optical axis. In this case, the original optical axis 515A and the optical axis 515B of the camera 510 after rotation intersect at a "virtual pivot axis" aligned with the nodal point 514. The virtual pivot axis is an axis about which the camera appears to have rotated. Note that, since the interocular distance of a two-camera stereographic camera system is measured between the nodal points of the camera lenses, the combined motions of the convergence plate 576 and linear slide 572 may maintain a constant interocular distance as the convergence angle is changed.

The combined motions of the convergence mechanism and the IOD mechanism may be used to rotate the camera 510 about a virtual pivot axis disposed at any point along the optical axis 515A/515B, subject only to physical limitations on the maximum and minimum lengths of the linear slide 572. When the lens 512 is a variable focal length or zoom lens, the combined motions of the convergence mechanism and the IOD mechanism may be used to rotate the camera 510 about a virtual pivot axis aligned with the nodal point 514, so long as the distance y is known as a function of the focal length of the lens 512.

The rotation of the convergence plate 576 and the change in the length of the linear slide 572 may be performed essentially simultaneously. In this context, essentially simultaneously means that each incremental movement of the convergence plate is accompanied by, or interleaved with, an associated incremental change in the length of the linear slide such that the combined motions appear smooth and simultaneous to a viewer.

The convergence angle $\Theta$ of a stereographic camera system may be set by rotating one or both cameras about respective pivot points. When both cameras are rotated, the angle $\Phi$, as shown in FIG. 5, may be equal to $\Theta/2$. When only one camera is rotated, $\Phi=\Theta$.

Published Patent Application US2006/0204240A1 describes a Platform for Stereoscopic Image Acquisition which may be suitable for use in the camera platform 550.

Figure 6:
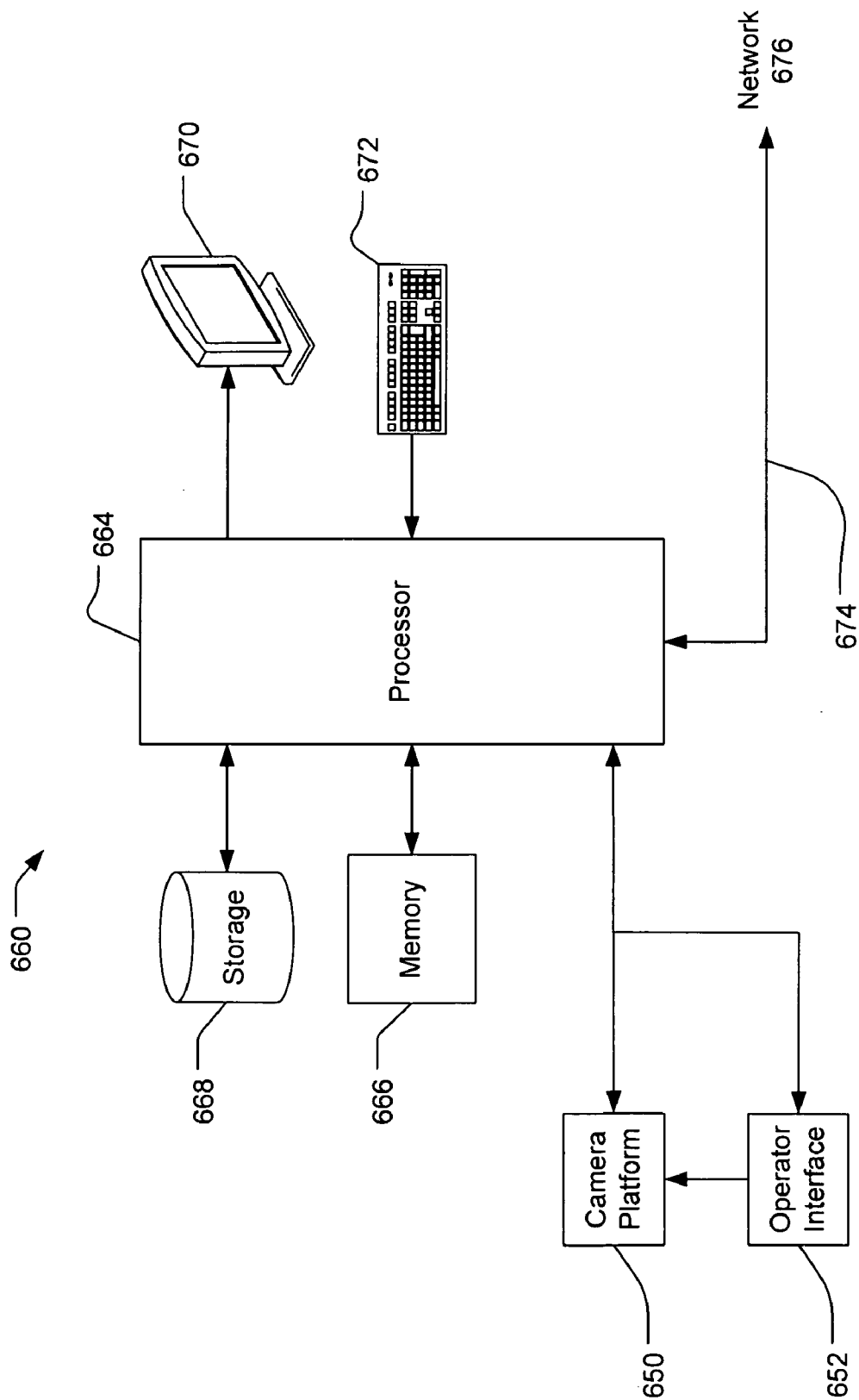
FIG. 6 is a block diagram of a computing device.

FIG. 6 is a block diagram of a computing device 660 that may be suitable for the controller 560. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 660 may include hardware, firmware, and/or software adapted to perform the processes subsequently described herein. The computing device may include a processor 664 coupled to memory 666 and a storage device 668.

The storage device 668 may store instructions which, when executed by the computing device 660, cause the computing device to provide the features and functionality of the controller 360. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 660 may include or interface with a display device 670 and one or more input devices such a keyboard 672. The computing device 660 may also interface with one or more networks 676. The interface 674 between the computing device 660 and the network 676 may be wired or wireless. The network 676 may be the Internet or any other private or public network.

The computing device 660 may also interface with a camera platform 650. The computing device 660 may also be coupled to an operator interface 662, either directly or through the camera platform 650.

The processes, functionality and features of the computing device 660 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 660 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 664 and others by other devices.

Description of Processes

Figure 7:
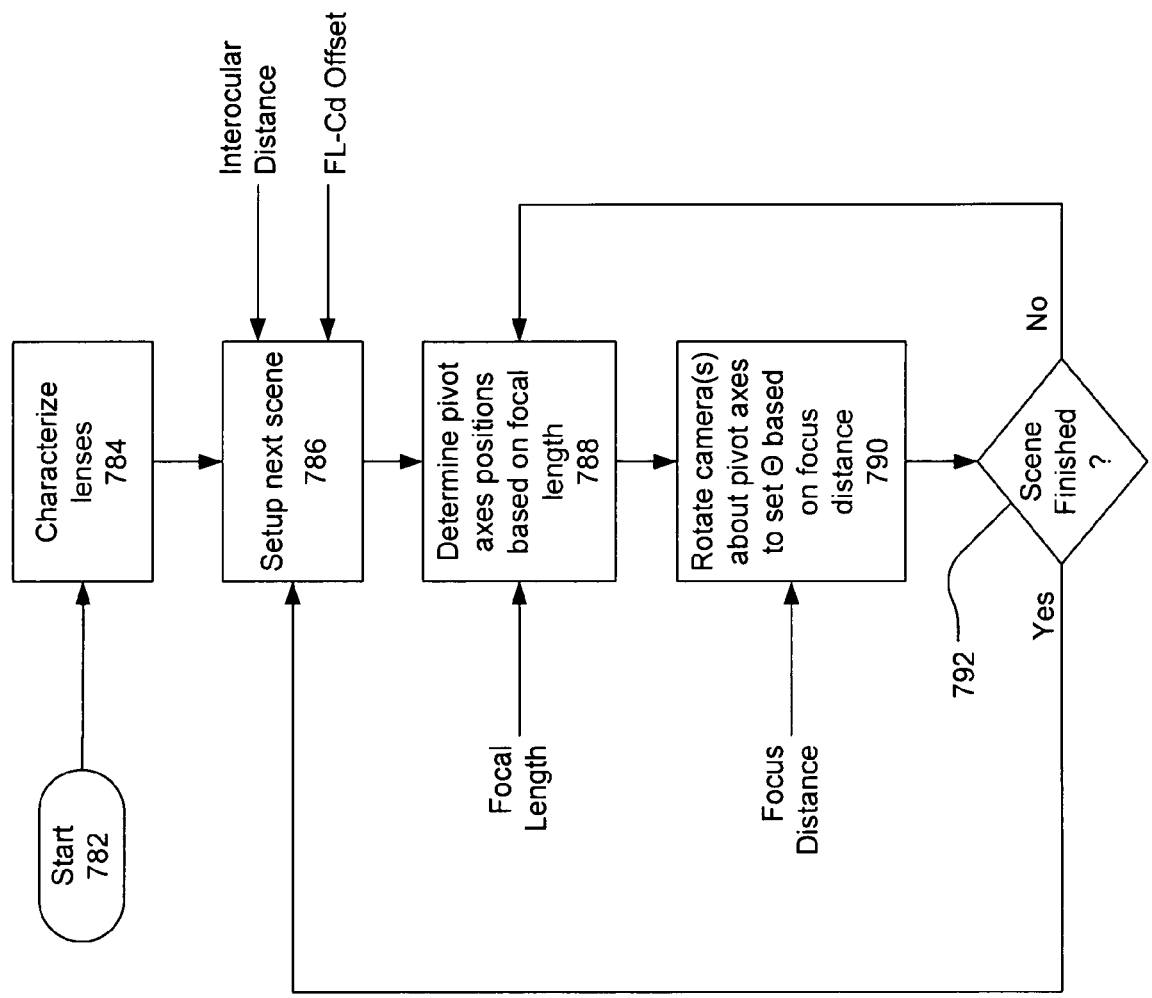
FIG. 7 is a flow chart of a process for recording stereo images.

FIG. 7 is a flow chart of an exemplary process 780 for recording stereographic images using a stereographic camera system including variable focal length zoom lenses, such as the stereographic camera 500. Specifically, FIG. 7 is a flow chart of a process for recording a scene or plurality of scenes using the same cameras and lenses. The flow chart has a start 782 but does not end until the recording of all scenes is completed or the camera lenses are changes. The process 780 is continuous in nature and the actions within the process may be performed continuously and in near-real time during the recording of each scene.

Within this patent, the phrase "near-real time" means in real time except for processing delays that are very short compared with temporal events in the scene being recorded.

At 784, the lenses to be used during recording one or more scenes may be characterized to develop information relating the location of a nodal point for each lens to the focal length to which the lens is set. For example, each camera may be set up to capture an image of a scene containing reference objects at two or more depths. Each camera may then be repeatedly rotated about a pivot axis while observing the parallax introduced into the image by the camera rotation. The position of the camera may be manually or automatically adjusted, for example using an apparatus similar to the camera platform 450 of FIG. 4, to a position where the rotation of the camera does not introduce parallax. At this point, the pivot axis and the nodal point of the camera lens may be aligned. The location of the lens nodal point may be determined for two or more settings of the lens focal length. The information relating the location of a nodal point for each lens to the focal length may be developed in the form of a look-up table, a formula expressing the location of the nodal point as a function of the focal length, or other data.

At 786, the stereographic camera system may be set up to record a specific scene. The setup may include receiving data to set an interocular distance and a focus distance to convergence distance (FL-CD) offset. As described in copending patent application Ser. No. 12/409,316, the setup may include receiving data indicating a maximum allowable disparity and a maximum object distance. In this case, the interocular distance may be calculated and set in near real-time during the recording of the scene.

At 788, data indicating the focal length of the camera lenses may be received and the location of pivot axes for one or both cameras of the stereographic camera system may be set based on the relationship between the lens focal length and the nodal point position as characterized at 784. The focal length may be changed, or zoomed, during the recording of the scene and the pivot axes locations may be set to be coincident with the nodal points in near real-time throughout the recording of the scene.

At 790, the convergence angle $\Theta$ of the two cameras of the stereographic camera system may be set by rotating one or both cameras about their respective pivot axes. The respective pivot axes may be virtual pivot axes that may not coincide with mechanical rotation axes. The convergence angle $\Theta$ may be set based on data indicating the focus distance of the camera lenses. The focus distance may be changed during the recording of the scene and the convergence angle may be set accordingly in near real-time throughout the recording of the scene.

At 792, a determination may be made if the recording of the scene has been completed. If the recording is ongoing, the process 780 may repeat continuously and in near real-time from 788. When the recording of a scene has been completed, the process 780 may finish at 798. Subsequently, the process 780 may start again from 786 to record another scene.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A stereographic camera system, comprising:
    a first camera and a second camera including respective first and second lenses
    a convergence mechanism
    a pivot shift mechanism
    wherein
        the convergence mechanism is adapted to set a convergence angle by rotating at least the first camera about a first pivot axis
        the pivot shift mechanism is adapted to adjust the position of the first camera with respect to the first pivot axis such that the first pivot axis passes through a no-parallax point of the first lens, wherein the no-parallax point of the first lens is a point on the axis of the first lens about which the first camera may be rotated without introducing parallax into the image captured by the first camera.

2. The stereographic camera system of claim 1, wherein
    the convergence mechanism is adapted to rotate the second camera about a second pivot axis
    the pivot shift mechanism is adapted to adjust the position of the second camera with respect to the second pivot point such that the second pivot axis passes through a no parallax point of the second lens, wherein the no parallax point of the second lens is a point on the axis of the second lens about which the second camera may be rotated without introducing parallax into the image captured by the second camera.

3. The stereographic camera system of claim 2, further comprising:
    a zoom mechanism adapted to synchronously set a focal length of the first lens and the second lens, wherein positions of the respective no-parallax points of the first lens and the second lens vary with the focal length set by the zoom mechanism
    a controller, responsive to the focal length set by the zoom mechanism, to control the pivot shift mechanism such that the first pivot axis passes through the no-parallax point of the first lens and the second pivot axis passes through the no-parallax point of the second lens.

4. The stereographic camera system of claim 3, further comprising:
    a focus mechanism adapted to synchronously set a focus distance of the first lens and the second lens
    wherein the controller controls the convergence mechanism to set the convergence angle based on, at least in part, the focus distance.

5. The stereographic camera system of claim 4, wherein the actions performed by the controller are performed in near-real time.

6. The stereographic camera system of claim 5, wherein the controller controls the convergence mechanism and the pivot shift mechanism essentially simultaneously.

7. The stereographic camera system of claim 3, wherein the first pivot axis and the second pivot axis are virtual pivot axes.

8. The stereographic camera system of claim 7, further comprising:
    an IOD mechanism adapted to adjust an interocular distance between the no parallax point of the first lens and the no-parallax point of the second lens
    wherein the controller controls the convergence mechanism and the IOD mechanism such that the combined motions of the convergence mechanism and the IOD mechanism cause the first and second cameras to rotate about respective first and second virtual pivot axes.

9. The stereographic camera system of claim 8, wherein the controller controls the convergence mechanism and the IOD mechanism to set the convergence angle, to set the locations of the first and second pivot axes, and to set the interocular distance.

10. A method for controlling a stereographic camera including first and second cameras having respective first and second lenses, the method comprising:
    synchronously setting a focal length for the first lens and the second lens
    synchronously setting a focus distance for the first lens and the second lens
    positioning the first camera based on the focal length such that a first pivot axis passes through a no-parallax point of the first lens, wherein the no-parallax point of the first lens is a point on the axis of the first lens about which the first camera may be rotated without introducing parallax into the image captured by the first camera
    rotating at least the first camera to set a convergence angle based on the focus distance, the first camera rotating about the first pivot axis.

11. The method of claim 10, wherein the method is performed in near-real time.

12. The method of claim 11, wherein the positioning and the rotating are performed essentially simultaneously.

13. The method of claim 10, further comprising:
    characterizing the first lens to determine a relationship between the location of the no-parallax point of the first lens and the focal length
    wherein the first camera is positioned based on the relationship between the location of the no-parallax point of the first lens and the focal length.

14. The method of claim 13, wherein
    characterizing the first lens comprises developing one of a table of values and a formula relating the location of the no-parallax point to the focal length.

15. A computing device to control a stereographic camera, the computing device comprising:
    a processor
    a memory coupled with the processor
    a storage medium having instructions stored thereon which, when executed, cause the computing device to perform actions comprising
        receiving inputs indicating a focal length of lenses associated with a first camera and a second camera and a focus distance of the lenses controlling a positioning mechanism to shift a position of the first camera such that a first pivot axis passes through a no-parallax point of the first lens, wherein the no-parallax point of the first lens is a point on the axis of the first lens about which the first camera may be rotated without introducing parallax into the image captured by the first camera controlling a convergence mechanism to rotate at least the first camera to set a convergence angle based on the focus distance, the first camera rotating about the first pivot axis.

16. The computing device of claim 15, wherein the actions performed by the computing device are performed in near-real time.

17. The computing device of claim 16, wherein controlling a convergence mechanism and controlling positioning mechanism are performed essentially simultaneously.

18. The computing device of claim 15, wherein the first camera is positioned based on a relationship between the location of the no-parallax point of the first lens and the focal length.

19. The computing device of claim 16, wherein the relationship between the location of the no-parallax point of the first lens and the focal length is defined by one of a look-up table and a formula.

* * * * *